Dec. 31, 1968    D. TANNER    3,419,053
CONTAINER-FILLING MACHINE
Filed May 23, 1966    Sheet 1 of 5

INVENTOR.
DALE TANNER
BY Robert K. Youtie
ATTORNEY.

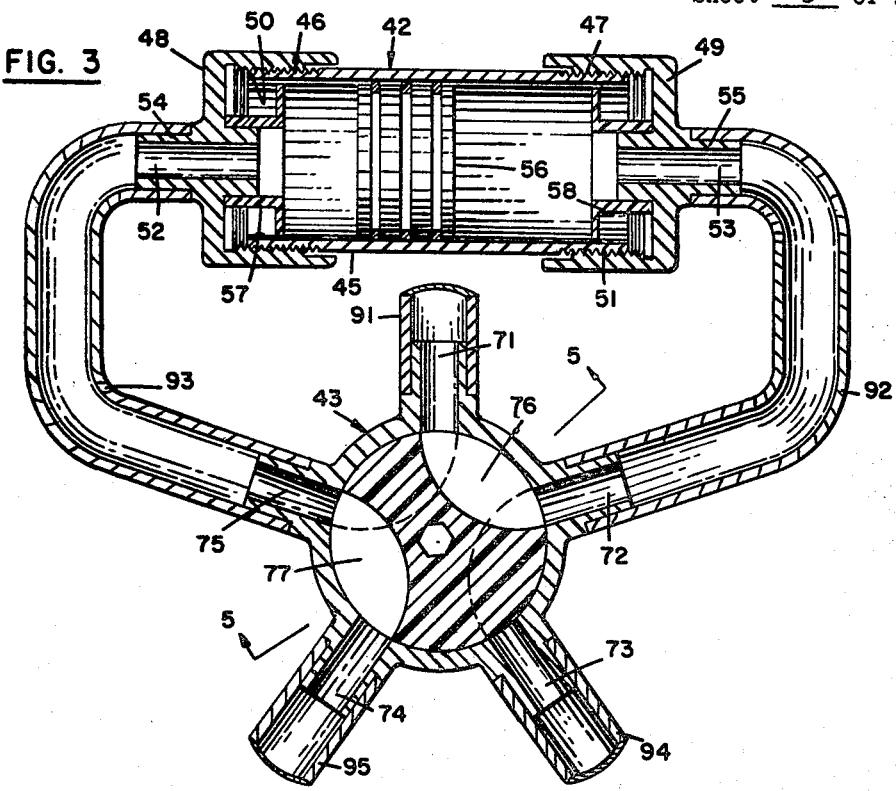
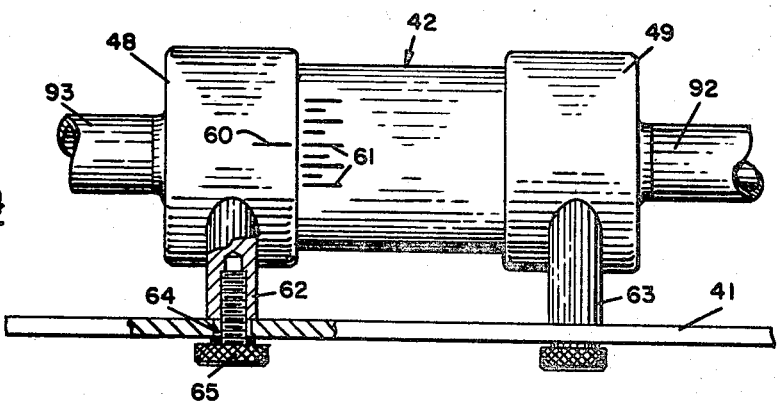
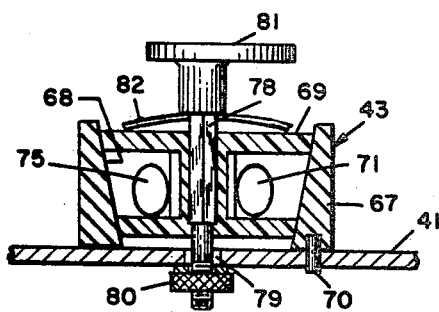

Dec. 31, 1968 D. TANNER 3,419,053
CONTAINER-FILLING MACHINE
Filed May 23, 1966 Sheet 5 of 5

INVENTOR.
DALE TANNER
BY Robert K. Kontie
ATTORNEY.

United States Patent Office 3,419,053
Patented Dec. 31, 1968

3,419,053
CONTAINER-FILLING MACHINE
Dale Tanner, 21 Academy Ave.,
Woodbury Heights, N.J. 08097
Filed May 23, 1966, Ser. No. 551,979
8 Claims. (Cl. 141—145)

ABSTRACT OF THE DISCLOSURE

The instant disclosure relates to a filling machine wherein a conveyor moves about an endless path for carrying containers thereabout, and mounting means movable with the conveyor carries a plurality of nozzles for movement with the containers through a filling station. A plurality of cylinders having free pistons are movable with the conveyor and nozzles, and a plurality of valves are associated with respective cylinders for alternately connecting a source of fluid supply to the associated cylinder on each side of its piston for charging the cylinder, and on the other side of the piston for discharging the cylinder through its nozzle and filling a container.

---

This invention relates generally to container-filling apparatus, and is especially concerned with machines for metering flowable materials to containers.

It is an important object of the present invention to provide a container-filling machine which is extremely accurate in metering the filling material to containers in a rapid, efficient and foolproof operation.

It is a further object of the present invention to provide a filling machine of the type described which may be quickly and easily disassembled, as for cleaning or changing of material being handled, and which eliminates previously required seals, packings and the like to prevent leakage, evaporation and contamination of the filling materials.

Is is a further object of the present invention to provide a highly advantageous metering-and-filling apparatus capable of many varied applications, including the metering and filling of plural separate materials simultaneously into a single container, wherein the metered quantity and filling materials may be quickly and easily changed with a minimum of effort, and which is durable and entirely reliable throughout a long useful life.

The instant invention further contemplates a metering-and-filling machine having the advantageous characteristics mentioned in the preceding paragraphs which is extremely simple in construction, relatively highspeed in operation, and can be economically manufactured, maintained and operated.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 3 is a horizontal sectional view illustrating one of the valve-and-cylinder assemblies shown in FIGURE 2;

FIGURE 4 is a side elevational view showing a cylinder of FIGURE 3 and its mounting arrangement, partly broken away for clarity;

FIGURE 5 is a sectional elevational view taken generally along the line 5—5 of FIGURE 3;

Figure 1:
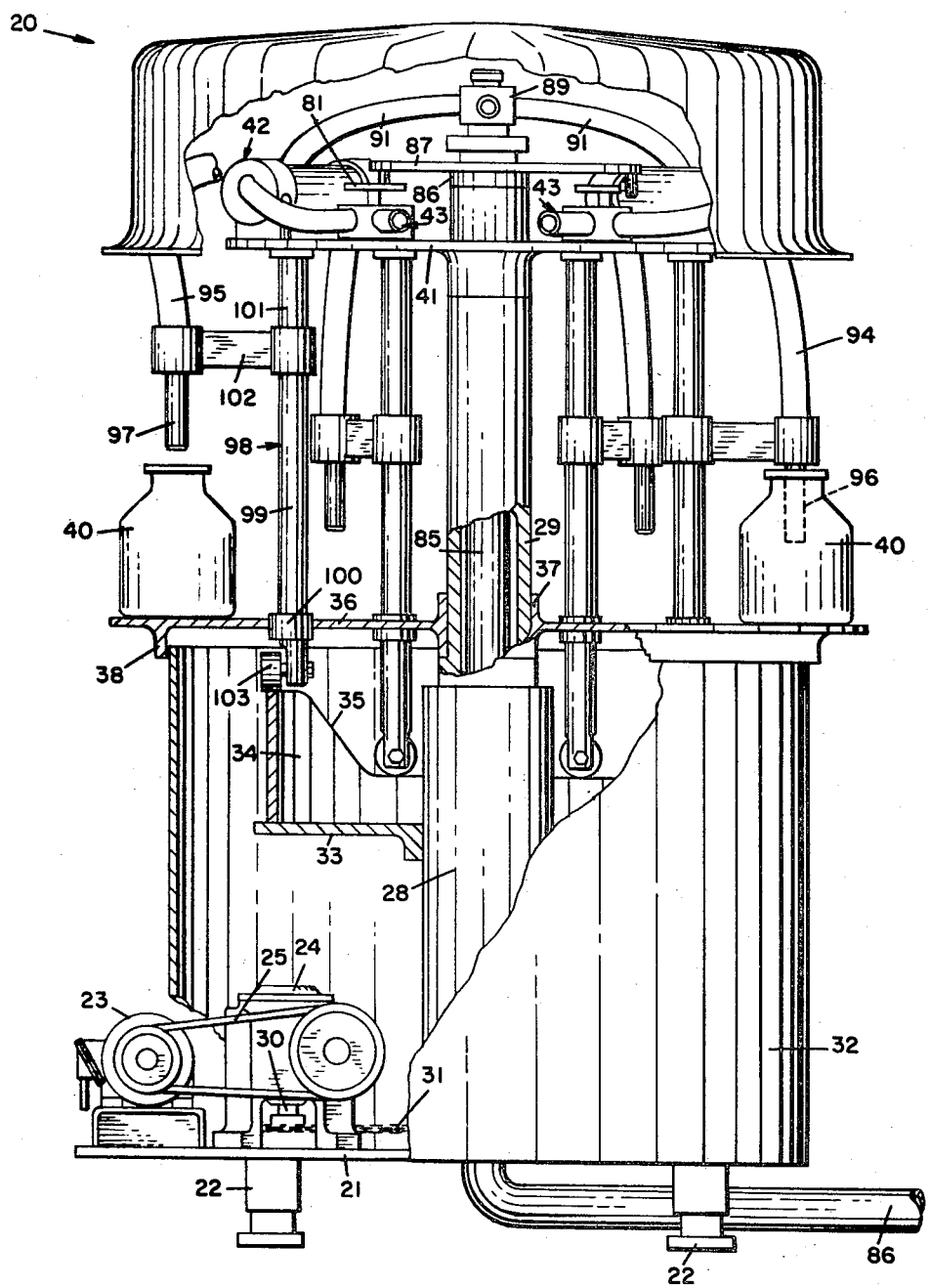
FIGURE 1 is a side elevational view showing a filling machine constructed in accordance with the teachings of the present invention, parts being broken away for clarity of understanding.

Referring now more particularly to the drawings, and specifically to FIGURE 1 thereof, the metering-and-filling machine of the present invention is there generally designated 20, and may include a lower horizontal support member, base or bed 21, which may be supported in elevated relation on any suitable floor or ground surface, as by a plurality of depending legs 22. Carried on the upper surface of base 21 may be a suitable motive means or motor 23 connected to any suitable source of energy, say electrically, or otherwise. A transmission or speed-reduction mechanism is generally designated 24 and may be connected by any suitable means to the motor 23, as by belt-and-pulley means 25.

Upstanding fixedly from a central region of base 21 may be a generally vertically disposed hollow post or tube 28 internally of which is rotatably supported an inner hollow post or tube 29. The output, as at 30, of transmission 24 may be connected by any suitable means, say chain 31, to the hollow post or shaft 29 to effect axial rotation of the latter.

A circumferential casing or housing 32 may upstand peripherally about the base 21, spacedly surrounding the journal post 28. Within the housing 32, fixedly secured to and extending circumferentially about the post 28 may be a horizontally disposed cam support member or plate 33. Upstanding from the support plate 33 extending peripherally thereabout may be a cam 34 having an upwardly facing surface 35 of generally circular configuration and plan and proceeding through different elevations, for reasons appearing more fully hereinafter.

Mounted on the upstanding rotary tube 29, extending over the cam 34 and cover side wall 32, is a generally circular, horizontal conveyor plate or container support 36. That is, the conveyor plate 36 may be fixed to the rotary shaft 29 by any suitable means, say including a collar 37, and extend radially therefrom beyond the side wall 32, having on its underside a depending annular skirt 38 extending about the upper edge portion of the side wall. The conveyor or plate 36 is adapted to rotate in a horizontal plane about the axis of hollow shaft 29 upon rotation of the latter, and support about its margin a plurality of containers 40 in the process of being filled. The containers 40 may be delivered to and removed from the rotary conveyor 36 by any suitable conventional means.

An upper, generally circular, substantially horizontally disposed support plate 41 is coaxially circumposed about and suitably secured to the tubular shaft 29 in vertically spaced relation over the conveyor plate 36. Thus, the upper support plate 41 rotates in a horizontal plane spaced over the lower conveyor plate 36, together with the latter upon rotation of the tubular shaft 29.

Figure 2:
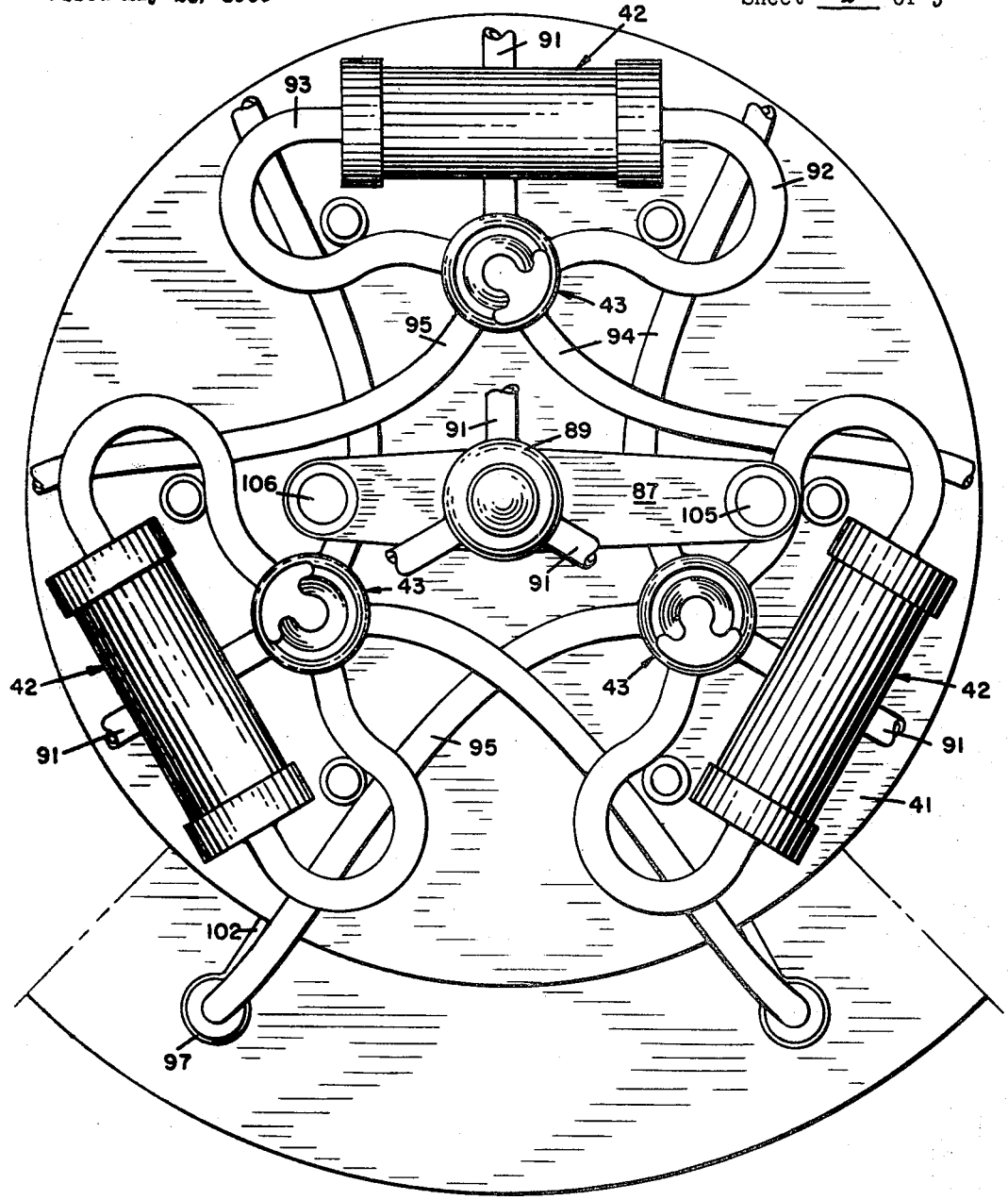
FIGURE 2 is a partial top plan view of the apparatus of FIGURE 1, with the cover removed.
Figure 6:
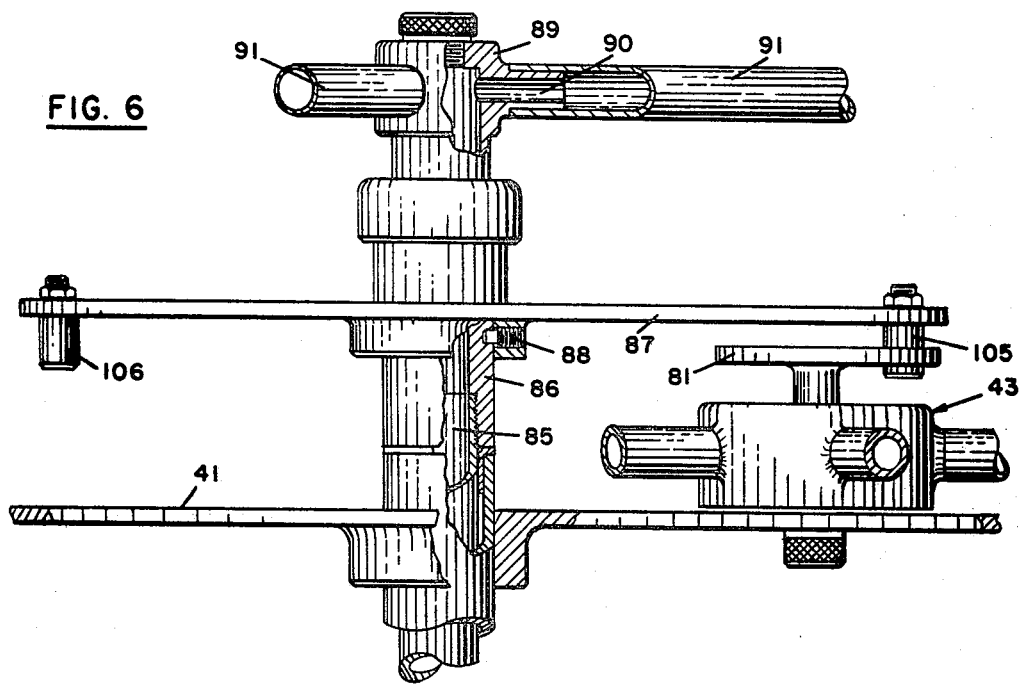
FIGURE 6 is a partial elevational view, partly broken away, showing a valve construction of FIGURES 2 and 3, and the mounting and operating means therefor.

Mounted on the upper side of the upper support plate 41, see FIGURE 2, are a plurality of cylinders, each generally designated 42. The cylinders 42 are illustrated as being three in number, but may be otherwise, if desired, and are shown as equally angularly spaced about the upper support plate. Associated with each cylinder 42 is a valve, generally designated 43, also mounted on the upper support plate 41, each adjacent to its respective cylinder.

The construction of each cylinder 42 is best seen in FIGURE 3 as including a cylindrical, open-ended tubular member or sleeve 45, which may be provided on its opposite ends with external screw threads, as at 46 and 47, respectively. The screw threads 46 and 47 are of opposite direction or opposite hand, one being a left-hand thread and the other being a right-hand thread. In closing relation with the opposite ends of sleeve 45 are a pair of end closures or caps, respectively designated 48 and 49, in threaded engagement with screw threads 46 and 47. Thus, the end closures or caps 48 and 49 are internally threaded, as at 50 and 51, respectively, which threads are also of opposite hand for proper engagement with mating threads 46 and 47. The end closures or caps 48 and 49 are each provided with a thru opening or port, as at 52 and 53, which may be defined by the interior of a reduced tubular portion 54 and 55, respectively, each having its opposite ends extending through and beyond the end wall of the associated end closure.

Interiorly of each cylinder 42, freely slidable therein, is a piston 56. Carried on the inner ends of tubular portions 54 and 55 are stop members or abutments 57 and 58, each projecting inward from its respective end closure 48 and 49 for limiting, abutting engagement with the piston 56 upon reciprocatory movement of the latter.

By virtue of the threaded connections between sleeve 45 and end closures 48 and 49, when the end closures are held against rotation and the sleeve is rotated in opposite directions, the end closures are caused to move toward and away from each other. This effects movement of the abutments 57 and 58 toward and away from each other to limit the throw or reciprocatory movement of piston 56, for a purpose appearing presently. The distance between the abutment members 57 and 58 may be determined from exteriorly of the cylinder 42 by calibration or markings 60 and 61 on the exterior of the sleeve 45 and at least one of the end closures 48. Thus, the relative location of the markings 60 and 61 may be calibrated to determine the throw and consequent delivery capacity of cylinder 42, for reasons to become apparent presently.

Suitable mounting means for the cylinders 42 may include a pair of legs or feet 62 and 63 depending respectively from end closures 48 and 49 toward support plate 41. The support plate may be provided with thru openings or holes, as at 64 each receiving a headed screw or fastener 65 extending upward through and in threaded engagement into the respective leg 61. By this arrangement, the headed fastener 65 may be backed off or loosened for longitudinal or volumetric adjustment of the cylinder 42, the fastener being spacedly received in opening 64, and subsequently retightened to hold the adjusted cylinder in firm supported relation on the plate 41.

Each of the valves 43 may be of a multiple-port construction, as best seen in FIGURES 3 and 5, including a circumferential casing or side wall 67 having a tapering, internal thru bore 68. The side wall 67 seats on the upper surface of support plate 41, with its thru bore 68 opening upwardly through its larger end. An externally tapering plug 69 is conformably engaged in the bore 68 of side wall 67, having its larger end upward and conformably rotatable therein. The side wall 67 may be nonrotatably connected to the support plate 41, as by a pin 70 or other suitable means. Provided at circumferentially spaced locations about the side wall 67 and opening radially therethrough are a plurality of ports, respectively designated 71, 72, 73, 74 and 75, in FIGURE 3. The ports 71–75 may be equally angularly spaced about the side wall 67, and the plug 69 may be formed with a pair of internal passageways 76 and 77 each of a segmental configuration such as to communicate between a pair of adjacent ports.

A noncircular shank 78 is coaxially engaged through plug 69 in a nonrotative relation relative thereto and projects beyond opposite upper and lower ends of the plug. The lower end of shank 78 extends spacedly through an opening 79 in the support plate 41 and is externally threaded for threaded insertion through an enlarged head or nut 80. Nonrotatably secured on the upper end of shank 78, above the plug 69, is a specifically configured operating element or arm 81, for a purpose appearing presently, and suitable resilient means, such as a leaf spring 82 may be carried on the shank 78 and held in resilient distention against the upper side of plug 69. The nut 80 thus engages the underside of support plate 41 to hold the shank 78 downward and enable the spring 82 to exert a resilient downward force against the plug 69, while the plug is rotatable in the valve side wall 67 by rotation of the operating element 81 through the noncircular shank 78.

Extending upwardly through the hollow rotary post 29 may be a supply conduit 85 having one end passing downwardly through the support plate 21 and radially outwardly, as at 86 for connection to a source of material to be metered. The supply conduit 85 extends upwardly through the rotary tube 29 and may be provided at its upper end with a fixed tubular fitting 86, as by threaded engagement with the upper end of the conduit or pipe 85. An operating arm 87 extends transversely across the fitting 86, in a generally horizontal plane, being rigidly secured to the fitting, as by a set-screw 88 or other suitable means. Upstanding from the operating arm 87, on the fitting 86, it a rotary or swivel fluid connection 89 having a plurality of outlet ports 90, corresponding in number to the cylinders 42. Thus, supply material may pass inward through the conduit portion 86, upward through the fixed conduit 85 and fitting 86, being dispensed therefrom radially outward through ports 90, as will appear more fully hereinafter.

Connected to each of the ports 90 of the swivel fitting 89 is one end of a supply conduit 91, the other end of which is connected to the port 71 of a respective valve 43. This serves to supply filling material to the valves. The ports 72 and 75 of each valve 43 are connected by respective conduits 92 and 93 to opposite end closures 49 and 48 of the associated cylinder 42. Thus, the ports 72 and 75 are in respective fluid communication with the interior of cylinder 42 on opposite sides of piston 56, as seen in FIGURE 3. In addition, the valve ports 73 and 74 are connected by respective fluid conduits 94 and 95 to respective nozzles 96 and 97, as seen in FIGURE 1.

The nozzles 96 and 97 are each associated with a single assembly of cylinder 42 and valve 43, and depend outboard of the support plate 41, being carried by nozzle-mounting means, which may be identical for all nozzles, as will be described presently.

The nozzle-mounting means, generally designated 98, mounting nozzle 97, includes a generally vertical rod 99 extending slidably through a bearing collar 100 mounted in the conveyor plate 36 and having its upper end telescopically received in a tube 101 depending from the underside of support plate 41. The rod 99 is provided with a transverse bracket 102 projecting radially outward of the assemblage and carrying at its outer end the depending nozzle 97. The lower end of rod 99 may be provided with a roller or cam follower 103 adapted to ride on the cam surface 35 to effect vertical reciprocation of the rod.

In operation, the drive means 23 may effect rotation of hollow posts 29, either continuously or intermittently, to rotate the conveyor plate 36, upper support plate 41, cylinders 42, valves 43, associated conduits, and nozzle-mounting means 98. Empty containers 40 are, by any suitable means, continually deposited at a loading station on the conveyor plate 36 beneath respective nozzles 96 and 97, as when the nozzles are elevated to the position of nozzle 97. However, operation of the instant device does not require that the nozzles be moved vertically, although such motion effects feeding of material to the lower inside region of the containers to minimize foaming and waste.

Under pressure from a source of material supply, the material passes upward through the fixed conduit 85 and is dispensed through the valve 43 to one side of the associated cylinder 42, the right-hand side as seen in FIGURE 3. This causes the free piston 56 to shift leftward and dispense a metered quantity of previously recevied filling material outward through conduit 93, valve 43 and conduit 95 to nozzle 97 for filling the nether container.

Upon rotation of the upper support plate 41, relative to the fixed operating arm 87, the valves 43 are sequentially operated. In particular, the operating arm 87 includes a pair of abutment members or pins 105 and 106 depending from the arm at radially and angularly spaced locations for operating engagement with the arcuately configured valve-operating elements 81. Thus, upon rotation of the upper support plate 41 causing a valve 43 to pass the engaging pin 105, the particular valve is operated to place a nozzle in fluid communication with one side of the piston 56, and the inlet conduit in fluid communication with the other side of the free piston. Upon continued rotation past the engaging pin 106, the other nozzle is placed in fluid communication with the piston side just filled, and the previously emptied piston side is placed in communication with the supply conduit 91. This procedure is repeated indefinitely upon continued rotation of the apparatus, it being apparent that each nozzle operates, at most, to fill through only a half of the cycle, the other half being adequate for removal of a filled container and replacement with an empty container.

Figure 7:
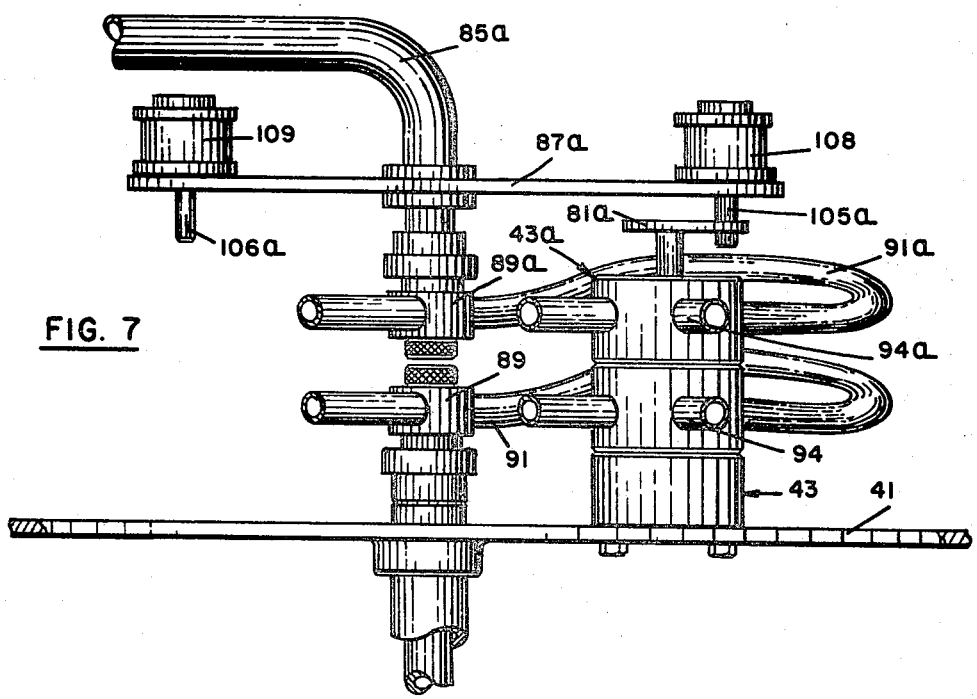
FIGURE 7 is a partial elevational view similar to FIGURE 6 showing a slightly modified embodiment of the instant invention.

Referring now to FIGURE 7, in the embodiment illustrated therein, there may be superposed on each valve 43 an additional valve 43a, both valves utilizing the same operating element 81a. In addition to the supply conduits 91 communicating between the swivel joint 89 and valve 43, there is provided an additional swivel joint 89a and additional supply conduits 91a communicating with the valve 43a. The swivel joint 89a may be carried by a fixed arm 87a, mounted by any suitable means, and an additional supply conduit 85a is connected to fluid communication with the swivel joint 89a from a separate reservoir of different supply material.

Depending from the fixed operating arm 87a at angularly and radially spaced locations are a pair of engaging pins 105a and 106a for operating engagement with the valve-operating element 81a.

The nozzle-feeding conduits 94 and 94a connected to respective valves 43 and 43a may merge and deliver different materials to the same nozzle. Thus, by the embodiment of FIGURE 7, more than one different filling material may be simultaneously supplied to each container, if desired.

Further, the engaging pins 105a and 106a may be carried by solenoids 108 and 109 energized in response to the absence of a container at the loading station to retract the respective pin. Thus, delivery of filling material in the absence of a container is prevented. Any suitable sensing means may be employed to ascertain the existence of a container at the proper location.

Figure 8:
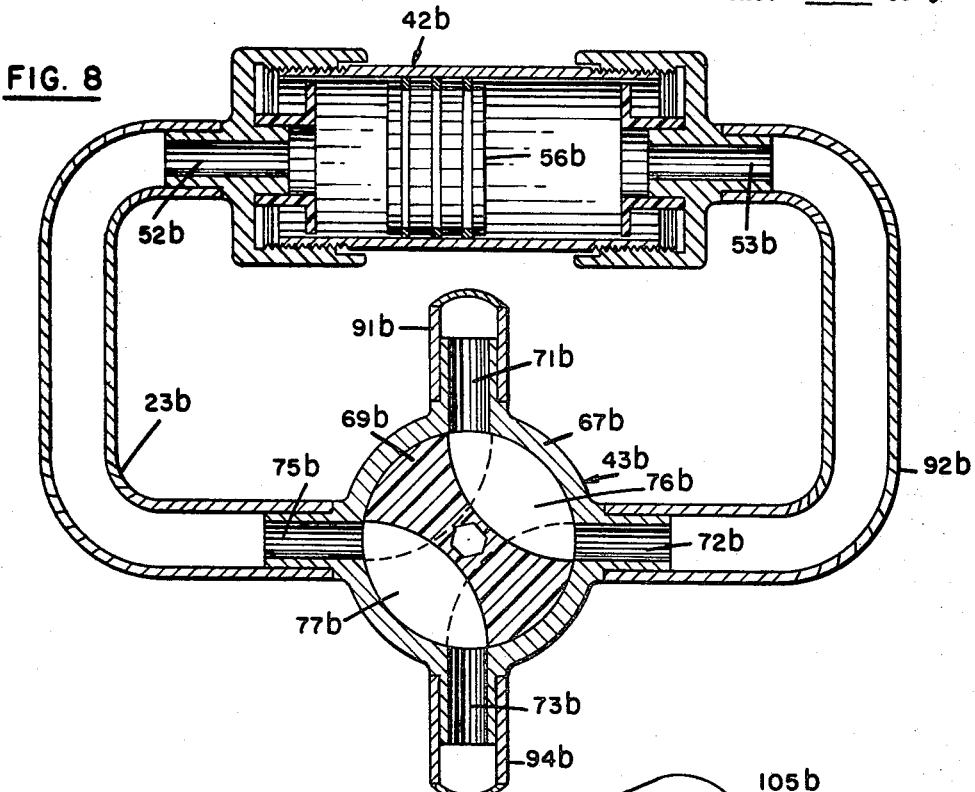
FIGURE 8 is a horizontal sectional view similar to FIGURE 3, but illustrating a modification thereof.
Figure 9:
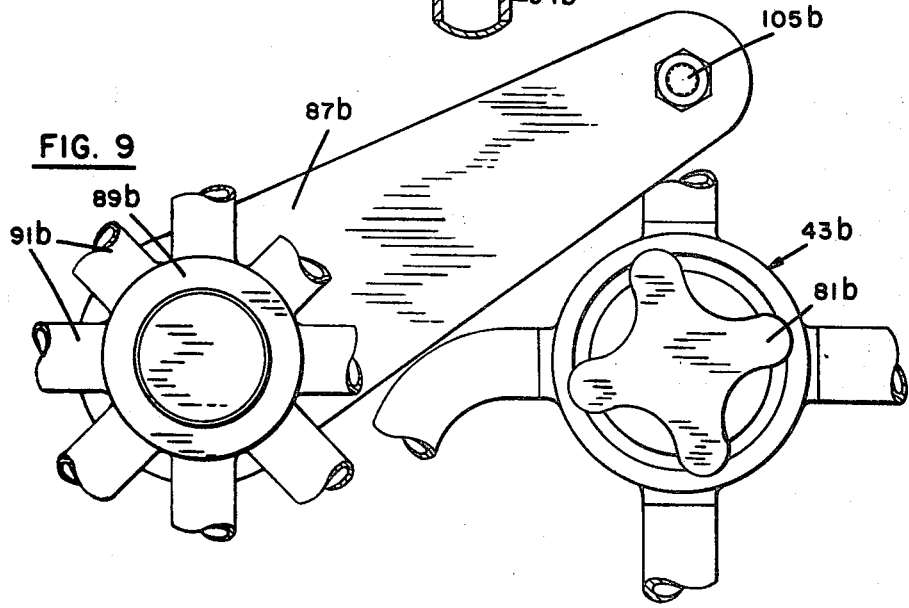
FIGURE 9 is a top plan view similar to FIGURE 2, but illustrating the embodiment of FIGURE 8.

Referring to the additional embodiment of FIGURES 8 and 9, wherein a cylinder 42b is associated with each nozzle, and a valve means 43b is provided for each nozzle, the cylinder 42b may be substantially identical to the cylinder 42, including a freely movable internal piston 56b and ports 52b and 53b communicating with the interior of the cylinder on opposite sides of the piston.

The valve means 43b may include an outer circumferential casing or side wall 67b having a plurality of circumferentially spaced thru ports 71b, 72b, 73b and 75b. The ports 72b and 75b may be connected in fluid communication by respective conduits 92b and 93b to cylinder ports 53b and 52b. The valve port 71b may be connected by a conduit 91b to a source of filling-material supply, and the port 73b may be connected by a conduit 94b to a nozzle. The internal valve element or plug 69b is rotatable in the casing 67b and provided with a pair of passageways 76b and 77b for communication between selected pairs of ports. As illustrated in solid lines, the valve-plug-element passageway 76b communicates between the supply conduit 91b and the right-hand side of cylinder 42b, while the valve-element pasageway 77b communicates between the left-hand side of the cylinder and nozzle-supply conduit 94b. Thus, filling material, in the condition illustrated in solid lines, passes from a supply reservoir to the right-hand side of cylinder 42b, and simultaneously passes out from the left-hand side of the cylinder for discharge through the nozzle. Upon rotation of the valve plug 69b, say to the dashed-line position, it will appear that supply-reservoir communication is established with the left-hand side of cylinder 42b, and nozzle communication is established with the right-hand side of the cylinder. In the illustrated embodiment, rotation of plug 69b between the alternate positions is approximately 90 degrees.

As best seen in FIGURE 9, the valve 43b may include a rotary operating element 81b having a plurality of arms or lobes for purposes appearing presently.

The fixed arm 87b corresponds to the fixed arm 87, extending horizontally from a fixed center-post fitting over a path of movement of valve 43b. Associated with the arm may be a multiple-port discharge fitting 89b corresponding to the fitting 89 and having connected thereto a plurality of supply conduits 91b. Depending from the radially outer end of arm 87b may be an operating pin 105b for operating engagement with the rotary-valve operating element 81b. That is, upon relative movement of the valve 43b in its arc about the vertical axis of the assembly, the depending pin 105b engages one of the arms or lobes of the operating element to effect substantially 90-degree rotation thereof and switch the position of valve plug 69b between the illustrated positions. Where a single operating pin 105b is employed, the valve means 43b is switched once every revolution of the rotating mounting assembly, so that a container is filled from one side of the cylinder 42b each rotation of the conveyor plate 36b. Of course, additional actuating pins 105b may be employed to increase the number of filling cycles per revolution of the conveyor.

From the foregoing, it is seen that the present invention provides a container-filling apparatus which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claim is:

1. A container-filling machine comprising a rotary conveyor movable along a predetermined endless path for conveying containers to be filled through a filling station, a plurality of nozzles, mounting means mounting said nozzles for movement along said path together with the containers, a source of filling-material supply, a plurality of cylinders carried by said mounting means for movement therewith and each having its opposite ends connected in fluid communication with a respective one of said nozzles, a free piston in each of said cylinders, a plurality of valves each associated with a respective cylinder and movable therewith for alternately connecting said source to said cylinder on each side of said piston for charging the cylinder and connecting the associated nozzle to said cylinder on the opposite side of said piston for discharging the cylinder and filling a container, and operating means movable relative to said valves to operate the latter responsive to a container and the associated nozzle being in said filling station.

2. A container-filling machine according to claim 1, said nozzle-mounting means including reciprocatory means for insertion and withdrawal of said nozzle means with respect to a container.

3. A container-filling machine according to claim 2 said operating means being located along the path of said valves for operative engagement with said valves upon movement of the latter.

4. A container-filling machine according to claim 3, said valves each comprising a multiple-port rotary valve having a pair of ports respectively connected to the associated cylinder on opposite sides of its piston, and additional ports respectively connected to said source and respective nozzle.

5. A container-filling machine according to claim 1 said source comprising at least a pair of supply reservoirs, and said valves each having a pair of ports connected to the respective cylinder on opposite sides of the associated free piston and each having additional ports connected to respective reservoirs and said nozzle means.

6. A container-filling machine according to claim 1, said cylinder means comprising a tubular body having opposite-direction threads at respective ends, and end closures in threaded engagement with opposite ends of said body, whereby rotation of said body relative to said end closures effects movement of the latter toward and away from each other to vary the volume of said cylinder means.

7. A container-filling machine according to claim 1, said valve means comprising an internally tapered circumferential casing having its larger end open and provided with ports at circumferentially spaced locations, an externally tapered plug conformably and rotatably engaged in said casing and having internal passageways for selective communication between said ports upon plug rotation relative to said casing, a shank engaged nonrotatably and coaxially in said plug and extending therefrom, and an operating element on said shank for effecting rotation of said plug.

8. A cylinder construction comprising an open-ended hollow tube having right- and left-hand threads at respective opposite ends, a pair of end closures threadedly engaged on opposite ends of said tube, and indicia means externally on said tube and at least one of said end closures indicating the position of relative rotation thereof.

References Cited

UNITED STATES PATENTS 384,766   6/1888   Kendall _____ 222—249
2,179,667  11/1939  Milos.

FOREIGN PATENTS 156,037   4/1954   Australia.
328,789   5/1930   Great Britain.

HOUSTON S. BELL, JR., *Primary Examiner.*

U.S. Cl. X.R.

141—248; 222—249; 220—39